US012583012B2

(12) United States Patent
Waniowski

(10) Patent No.: US 12,583,012 B2
(45) Date of Patent: Mar. 24, 2026

(54) LOCKING ASSEMBLY AND ROLLER ASSEMBLY EMPLOYING THE SAME

(71) Applicant: Kamil Waniowski, St Erme (GB)

(72) Inventor: Kamil Waniowski, St Erme (GB)

( * ) Notice: Subject to any disclaimer, the term of this patent is extended or adjusted under 35 U.S.C. 154(b) by 27 days.

(21) Appl. No.: 18/329,846

(22) Filed: Jun. 6, 2023

(65) Prior Publication Data

US 2024/0408642 A1 Dec. 12, 2024

(51) Int. Cl.
*B05C 17/02* (2006.01)

(52) U.S. Cl.
CPC ................................ *B05C 17/0237* (2013.01)

(58) Field of Classification Search
CPC ............................ B05C 17/02; B05C 17/0237
See application file for complete search history.

(56) References Cited

U.S. PATENT DOCUMENTS 4,943,176 A * 7/1990 Baker ................. A61M 35/003 132/320
5,870,795 A * 2/1999 Sizemore ............ B05C 17/0237 492/19
9,616,455 B1 * 4/2017 Hodges ............... B05C 17/0237
2005/0011032 A1 * 1/2005 Bosler ................. B05C 17/0237 492/19

FOREIGN PATENT DOCUMENTS

GB 2601551 A 6/2022
JP 09206661 A * 8/1997
JP 2002-282769 A * 10/2002

OTHER PUBLICATIONS

JP2002-282769 A; Oct. 2, 2002; Yatabe.*

* cited by examiner

*Primary Examiner* — Shay Karls
(74) *Attorney, Agent, or Firm* — Alumen IP Law PC

(57) ABSTRACT

A lock assembly for a roller assembly is provided. The roller assembly has a frame with a support portion; and a roller rotatably mounted on the support portion of the frame. The lock assembly includes a lock member support; a lock member moveable relative to the lock member support between a first position and a second position; wherein when the lock assembly is employed with the roller assembly, with the lock member in the first position the roller is rotatable relative to the frame and with the lock member in the second position, the lock member engages with the roller to prevent rotation of the roller relative to the frame. A roller assembly having the lock assembly is also provided.

12 Claims, 18 Drawing Sheets

Figure 18b
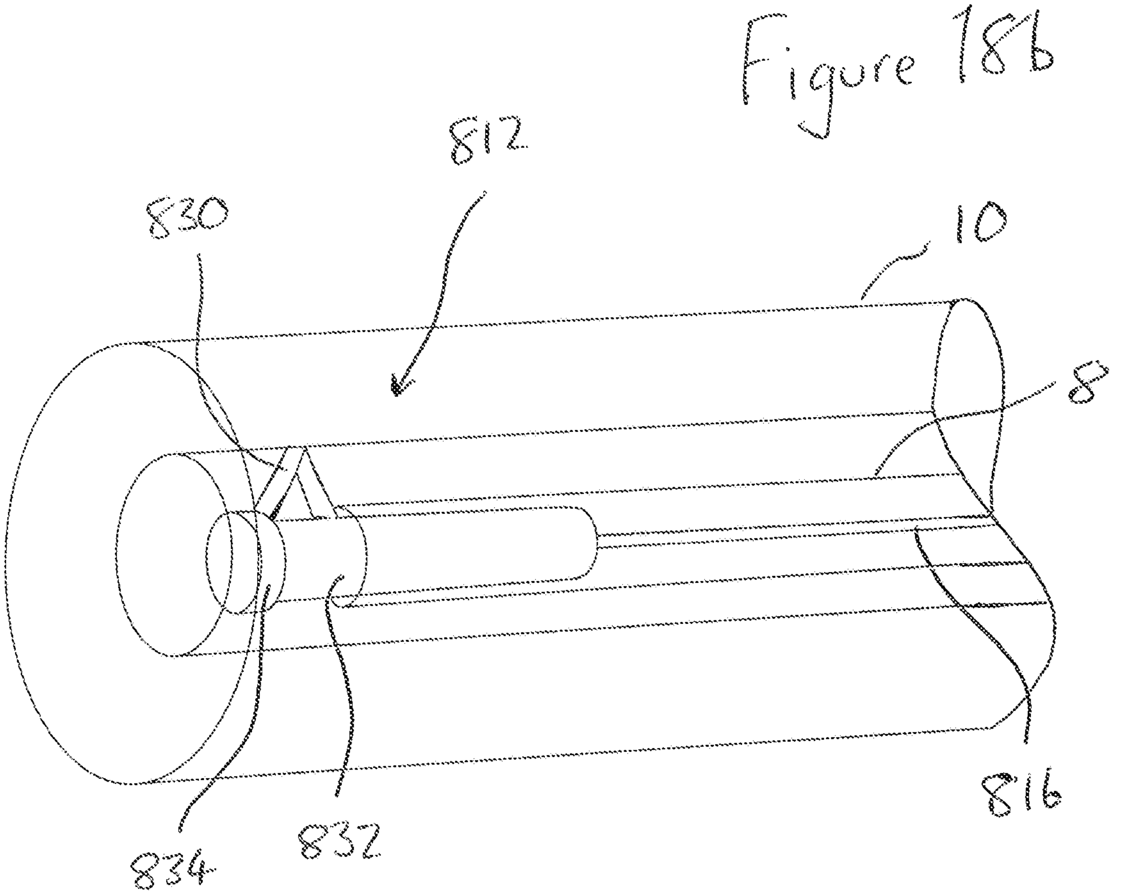
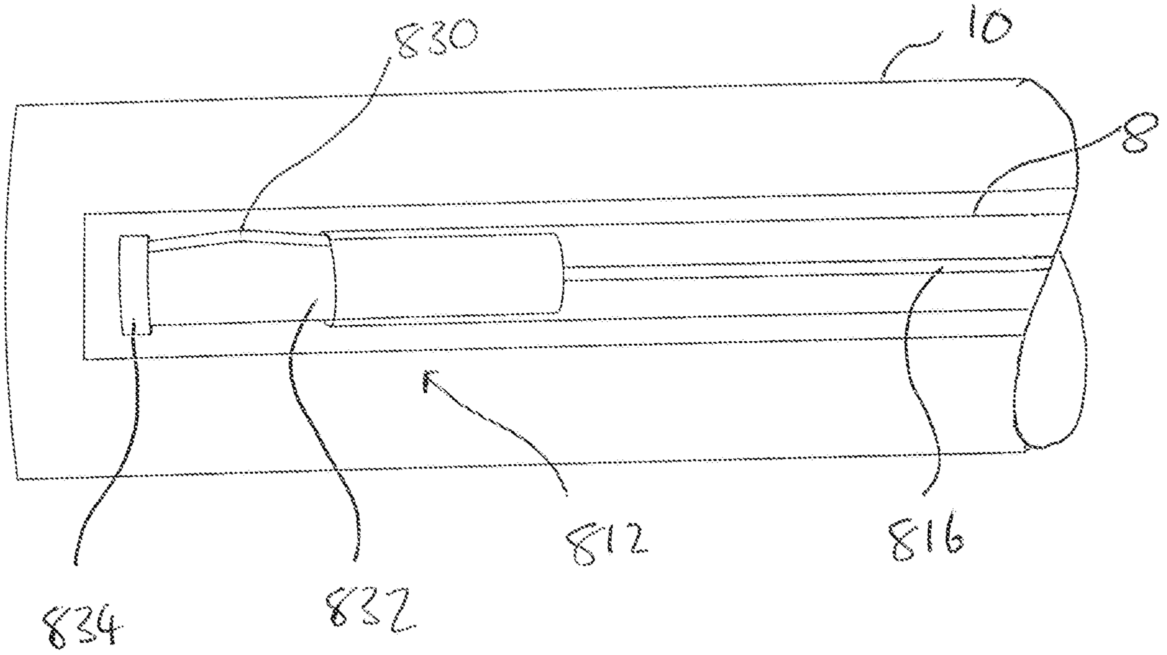
Figure 18a

LOCKING ASSEMBLY AND ROLLER ASSEMBLY EMPLOYING THE SAME

BACKGROUND

The present invention relates to a roller assembly of the general kind used in applying a liquid to a surface, such as paint and the like. The present invention further relates to a method of applying a liquid, such as a paint, to a surface using a roller assembly.

Roller assemblies for use in applying a liquid to a surface are well known. Such assemblies find extensive use in applying paint to a wide range of surfaces, such as walls, ceilings and the like. In general, the roller assembly comprises a frame having a handle for being gripped in the hand of the user and a support portion for holder a roller. The roller is generally tubular and extends over the support portion of the frame so as to be rotatable relative to the frame. The curved outer surface of the roller is generally provided with a material for holding a liquid, such as paint. In use, the frame is held by the user in their hand with the curved outer surface of the roller in contact with the surface to which the liquid is being applied. The frame is moved to and fro parallel to the surface, causing the roller to rotate about the support portion of the frame and roll across the surface, thereby applying the liquid held in the surface covering of the roller to the surface. Liquid is applied to the curved outer surface of the roller as required, for example by immersing part or all of the roller in a container containing the liquid.

In general, roller assemblies of the general type described above have found widespread use and have been employed for many years.

However, a problem arises with such roller assemblies. In particular, the roller assemblies are not suitable for use with all forms and configurations of surfaces. As a result, the rollers must generally be used in conjunction with an alternative means for applying the liquid to the surface, typically a brush.

SUMMARY

It would therefore be very advantageous if the effectiveness of the aforementioned roller assemblies could be expanded, in turn reducing the need to employ an alternative means of applying the liquid to the surface.

The present invention provides a locking assembly for a roller assembly of the aforementioned kind. The locking assembly allows the roller to be releasably locked with respect to the frame, such that the roller is not able to rotate relative to the frame. Locking the roller in this way allows the roller assembly to be employed in the manner of a brush and apply liquid to a surface by wiping the surface of the roller across the surface.

According to a first aspect of the present invention, there is provided a lock assembly for a roller assembly, the roller assembly comprising:

a frame comprising a support portion; and a roller rotatably mounted on the support portion of the frame;

the lock assembly comprising:

a lock member support;

a lock member moveable relative to the lock member support between a first position and a second position;

wherein when the lock assembly is employed with the roller assembly, with the locking member in the first position the roller is rotatable relative to the frame and with the locking member in the second position, the locking member engages with the roller to prevent rotation of the roller relative to the frame.

The present invention provides a lock assembly for use with a roller assembly. Roller assemblies of the kind for use with the present invention are well known in the art and are used in large numbers. The roller assembly generally comprises a frame. The frame is metal in many cases, however other materials may be used to form the frame, such as plastic. The frame has a support portion on which is mounted a roller. The frame of the roller assembly generally also comprises a handle portion. The handle portion may be held in the hand of the user. Alternatively or in addition, the handle portion may be configured to be attached to an extension, such as a tube or pole, which in turn is held by the user. The roller assembly further comprises a roller. The roller is mounted on the support portion of the frame, so as to be rotatable with respect to the frame. The roller is generally in the form of an elongate cylinder, in use the outer curved surface of the cylinder being pushed or held in contact with a surface. The outer curved surface of the cylinder may have any suitable form for the function to be performed. For example, a popular form for the outer curved surface of the roller is one that is able to hold a liquid to be applied to the surface. This may be achieved by the use of a suitable absorbent material or a material having fibres or a pile to hold liquid for application to the surface. Again, these features are well known in the art.

The present invention provides a lock assembly for use with a roller assembly of the aforementioned kind. The lock assembly comprises a lock member support. The lock assembly may be formed integrally with the roller assembly or may be provided as a separate assembly for attaching to the roller assembly. For example, the lock member support may be provided as a separate component to the frame of the roller assembly and the lock member support is attachable to the frame. Preferably, in one embodiment, the lock member support is releasably attachable to the frame of the roller assembly. Alternatively, the lock member support may be formed integrally with the frame of the roller assembly.

In embodiments in which the lock member support is provided as a separate component to the frame, the lock member support is attachable to the frame. In one embodiment, the lock member support is mounted on the frame by first removing the roller or the handle from the frame. The lock member support of the lock assembly may then be mounted to the frame, for example by sliding over a portion of the frame, to have at least a portion of the lock member support extending around a portion of the frame. The roller or the handle may then be replaced.

In an alternative embodiment, the lock member support is arranged to be mounted onto a portion of the frame of the roller assembly without removing components of the roller assembly, for example with the roller and handle in place. Again, it is preferred that the lock member support is releasably mountable to the frame of the roller assembly, for example such that it can be removed from the frame without removing components of the roller assembly, such as the roller or the handle.

The lock member support may attach to the frame of the roller assembly by any suitable means. The means for attaching the lock member support to the frame of the roller assembly may accommodate a portion of the frame and extend partially or wholly around the portion of the frame.

In one embodiment, the lock member support comprises one or more clips to attach the lock member support to the frame of the roller assembly. Each clip preferably accommodates a portion of the frame, such that the clip extends partially around the circumference of the frame portion. Each clip preferably comprises a pair of spaced apart, opposing clip members. The clip members are preferably resilient. The distance between the opposing clip members is preferably less than the diameter of the portion of the frame of the roller assembly to which the lock member support is to be attached. In use, the clip is pushed against the frame of the roller assembly, urging the resilient clip members apart and allowing the frame portion to sit between the clip members.

In one embodiment, the lock member support comprises one clip.

In an alternative embodiment, the lock member support comprises a plurality of clips, for example two clips. In embodiments with a plurality of clips, it is preferred that a first clip is disposed on the lock member support for mounting to a first portion of the frame of the roller assembly and a second clip is disposed on the lock member support for mounting to a second portion of the frame of the roller assembly, more preferably wherein the first and second portions of the frame do not lie in a straight line and extend at an angle to each other, preferably 90°.

The one or more clips of this embodiment provide the advantage that the lock assembly can be mounted to the frame of the roller assembly without requiring the roller assembly to be partially or wholly disassembled. The clips preferably allow the lock assembly to be releasably mounted to the frame.

The one or more clips may be formed with the lock member support as a single component, for example by moulding.

In an alternative embodiment, the lock member support comprises one or more support members arranged to accommodate a portion of the frame of the roller assembly, such that the support member extends wholly around the portion of the frame. Each support member may be ring-shaped or tubular. In this embodiment, the roller assembly generally requires at least partial disassembly, in order to pass a portion of the frame through the or each lock member support.

The one or more support members may be formed with the lock member support as
a single component, for example by moulding.

The lock member support may be formed from any suitable material, including metal or plastic. Plastic is a preferred material, which allows the lock member support to be prepared by techniques such as moulding.

The lock assembly of the present invention further comprises a lock member. The lock member is retained by the lock member support and is moveable relative to the lock member support between a first position and a second position. With the locking member in the first position the roller is rotatable relative to the frame. With the locking member in the second position, the locking member engages with the roller to prevent rotation of the roller relative to the frame.

The lock member may engage with any suitable portion of the roller. For example, the lock member may engage with the exterior of the roller or with the interior of the roller. In one preferred embodiment, the lock member engages with the exterior of the roller. The lock member may engage with any portion of the exterior surface of the roller, such as an end of the roller or, more preferably, with the curved exterior surface of the roller. In an alternative preferred embodiment, the lock member engages with the interior of the roller. The lock member may engage with any portion of the interior surface of the roller, such as an end of the roller or, more preferably, with a curved interior surface of the roller.

In the present specification, references to the lock member 'engaging' with the roller are to any form of contact between the lock member and the roller that prevents the roller from rotating relative to the frame of the roller assembly.

The roller may be provided with one or more forms on a surface of the roller that are engageable by the lock member. For example, the roller may be provided with one or more protuberances, such as teeth, or one or more recesses.

More preferably, the lock member engages with a surface of the roller in the second position and a sufficient force is applied by the lock member to the roller to create sufficient friction between the lock member and the surface of the roller to prevent the roller from rotating relative to the frame. In this way, the lock assembly of the present invention may be applied to existing designs of roller assembly, without requiring any modification to parts of the roller assembly, such as the roller.

The lock member may be retained by the lock member support in any suitable manner that allows the lock member to be moved relative to the lock member support and engage with or disengage from the roller. The lock member may be moveable between the first and second positions in a linear motion relative to the lock member support, for example slide along a single line relative to the lock member support. For example, the lock member may be arranged to slide over an elongate portion of the lock member support or to slide through a hole or bore in the lock member support. Alternatively, the lock member may be moveable between the first and second positions by rotation of the lock member relative to the lock member support, for example by means of a threaded connection between the lock member and the lock member support or by having the lock member pivotably mounted to the lock member support. In a further alternative, the lock member may be moveable between the first and second positions by both rotation and linear motion relative to the lock member support. In a further alternative, the lock member is engaged with the roller by the lock member being deformed, such that a portion of the lock member moves from the first position out of contact with the roller into the second position in contact with the roller.

The lock member may be biased into one of the first or second positions. For example, the lock member may be formed from a resilient material, which provides the lock member with an inherent bias.

Alternatively or in addition, the lock member may be biased into one of the first or second positions by a biasing member, such as a spring or resilient biasing member. In one embodiment, a resilient biasing member urges the lock member into the first position, that is away from the roller. In an alternative embodiment, a resilient biasing member urges the lock member into the second position, that is into contact with the roller. In use, this may require the user to hold the lock member in the other of the first or second positions when required. For example, when the lock member is biased into the first position, the user may need to hold the lock member in the second position when rotation of the roller relative to the frame is not required. Similarly, when the lock member is biased into the second position, the user may need to hold the lock member in the first position in order to allow the roller to rotate relative to the frame. Alternatively, the lock assembly may comprise a releasable lock to hold the lock member into the other of the first or second positions against the action of the biasing member.

More preferably, the lock member is releasably held in one, more preferably both, of the first and second positions. In embodiments in which the lock member is threadably connected to the lock member support, the action of the threaded connection is to hold the lock member in each of the first and second positions, unless rotated by the user. Alternatively, the lock assembly may further comprise a releasable lock to hold the lock member in either the first position or the second position. The releasable lock may comprise a clamp member. The clamp member may be biased against the lock member, whereby movement of the clamp member against the bias allows the lock member to move relative to the lock member support.

The lock member may be of any suitable form. For example, the lock member may be elongate and arranged to move in a direction along its longitudinal axis into and out of contact with the roller. This form for the lock member is suitable for use in embodiments where the lock member is disposed to engage an outer surface of the roller.

Alternatively, as noted above, the lock member may be deformable. For example, the lock member may be in the form of a strip or sleeve that may be acted upon by a compressive force, to increase a lateral dimension and move into contact with a surface of the roller. This embodiment is particularly suited to arrangements in which the lock member engages with an inner surface of the roller.

In one embodiment, as noted above, the lock member comprises a resilient lock member that is biased by its resilience either into contact with an inner surface of the roller or out of contact with the inner surface. Preferably, the resilient lock member is inherently biased to be out of contact with the surface of the roller.

The lock member may be formed from any suitable material, including metal or plastic. Plastic is a preferred material, which allows the lock member to be prepared by techniques such as moulding. In embodiments where the lock member is resilient, the resilient lock member may be formed from any suitable material, such as a plastic or a metal, such as spring steel.

The lock member may be moved between the first and second positions by any suitable means. In one preferred embodiment the lock member is moved directly by the user holding and moving the lock member. In another preferred embodiment, the lock member is moved indirectly by the user, wherein the user moves an actuator, which in turn moves the lock member relative to the lock member support. The actuator may have any suitable form, for example a rod or a cable. The actuator may extend from the lock member, for example to the handle of the roller assembly. In one embodiment, the actuator comprises a cable. The cable is preferably a Bowden cable. Alternatively, the actuator member may comprise a threaded actuation member moveable on a threaded portion of the lock member support.

The indirect actuation of the lock member from a position remote from the lock member is particularly advantageous in embodiments where the lock member is disposed within the roller and engages with an inner surface of the roller.

In one embodiment, the lock member comprises a deformable lock member body, preferably formed from a resilient material, such as a metal, for example spring steel, plastic or rubber. In such embodiments, when a force is applied to the lock member body, it deforms and engages with a surface of the roller. Removing the force applied to the lock member body allows the body to return to its undeformed shape and out of engagement with the roller. In one embodiment, the resilient lock member is acted upon by an actuation member, which is moved remotely by the user. When moved by the user, the actuation member bears upon the resilient lock member to move it out of its bias position. Preferably, the actuation member acts on the resilient lock member to move the lock member against its bias into contact with the surface of the roller. The actuation member may have any suitable form. In one embodiment, the actuation member is preferably in the form of a cylinder.

The lock assembly may further comprise a guard extending partly or substantially wholly around part or all of the lock assembly. The guard is preferably disposed between the lock member and the roller and serves to shield the lock member and any components acting on the lock member. The lock member may be arranged to extend through the guard when moving into or out of the second position. The guard is preferably disposed to extend at least between a portion of the lock member and the roller. In this way, the guard reduces contamination of the lock assembly by liquid on the roller.

The guard may be formed with the lock member support as a single component, for example by moulding. Alternatively, the guard may be formed as a separate component.

The guard may be formed from any suitable material, including metal or plastic. Plastic is a preferred material, which allows the guard to be prepared by techniques such as moulding.

In a further aspect, the present invention provides a roller assembly comprising:

- a frame comprising a support portion;
- a roller rotatably mounted on the support portion of the frame; and
- a lock assembly comprising a lock member moveable between a first position and a second position, wherein with the lock member in the first position the roller is rotatable relative to the frame and with the locking member in the second position, the locking member engages with the roller to prevent rotation of the roller relative to the frame.

The lock assembly and its components, such as the lock member, may be as hereinbefore described.

The lock assembly may engage with an outer surface of the roller, for example the curved outer surface or an end outer surface. Alternatively, the lock assembly may engage with an inner surface of the roller. In this embodiment, it is preferred that the lock assembly is operable remotely by the user, for example from the handle of the roller assembly.

The lock assembly may be formed integrally with the roller assembly. Alternatively, the lock assembly may be provided as a separate assembly to be mounted on the roller assembly, for example on the frame of the roller assembly.

In a further aspect, the present invention provides a kit of parts comprising one or more roller assemblies, each roller assembly comprising:

- a frame comprising a support portion;
- a roller rotatably mounted on the support portion of the frame;
- and
- one or more lock assemblies as hereinbefore described.

In use of the present invention, the lock assembly is in place on the roller assembly. Liquid to be applied to the surface being coated is applied to the roller in a known manner, such as by pouring liquid onto the roller or immersing part or all of the roller in a container holding the liquid, such as a tray. When it is required to use the roller assembly in the conventional manner, that is to apply the roller to the surface to be coated with the liquid and the assembly moved such that the roller rolls across the surface, the lock member is in the first position. When it is required to lock the roller and prevent it rotating relative to the frame of the roller assembly, the lock member is moved into the second position, in which the lock member engages with the roller, as hereinbefore described. Liquid may then be applied to the surface by bringing the roller into contact with the surface, but without having the roller rotate.

In a further aspect, the present invention provides a method for applying a liquid to a surface, the method employing a roller assembly comprising:

a frame comprising a support portion;

a roller rotatably mounted on the support portion of the frame;

the method comprising:

applying the liquid to the roller;

locking the roller to prevent rotation of the roller relative to the frame of the roller assembly; and applying the roller to the surface.

BRIEF DESCRIPTION OF THE DRAWINGS

Embodiments of the present invention will now be described, by way of example only, having reference to the accompanying drawings, in which:

FIG. 18*a* is a diagrammatic view of the roller of the assembly of FIG. 16 with one embodiment of the resilient locking member in a first position;

FIG. 18*b* is a diagrammatic view of the roller of the assembly of FIG. 16 with one embodiment of the resilient locking member in a second position;

DETAILED DESCRIPTION

Figure 1:
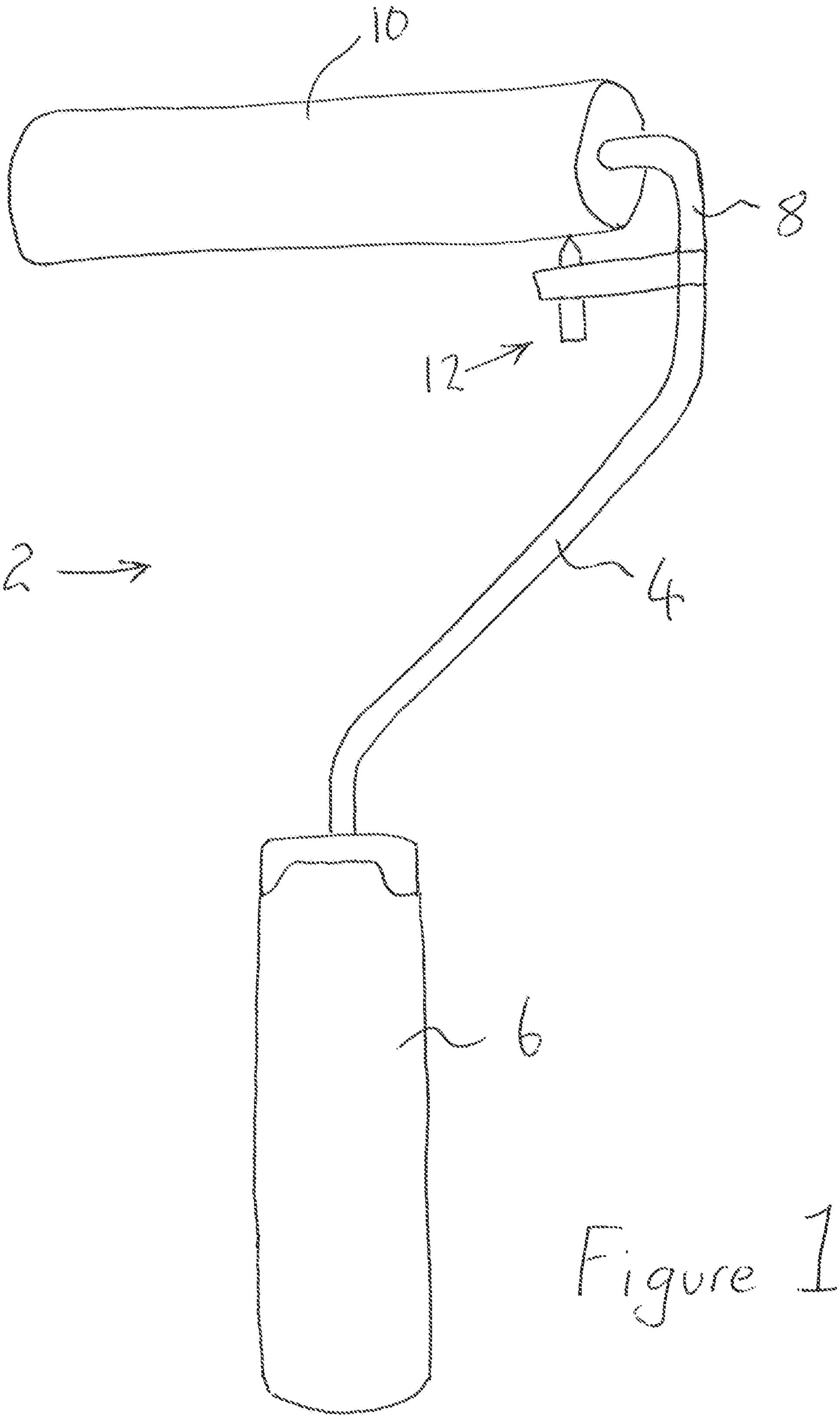
FIG. 1 is a view of a roller assembly of known configuration with a lock assembly according to the present invention.

Turning first to FIG. 1, there is shown a roller assembly, generally indicated as 2. The roller assembly is of conventional design and comprises a frame 4 having a handle portion 6 and support portion 8. A generally cylindrical roller 10 is mounted on the support portion 8 and is rotatable with respect to the frame 4. A lock assembly 12 according to the present invention is provided on the frame 4. The lock assembly 12 is operable to selectively lock the roller 10 and prevent the roller rotating relative to the frame 4.

Figure 2:
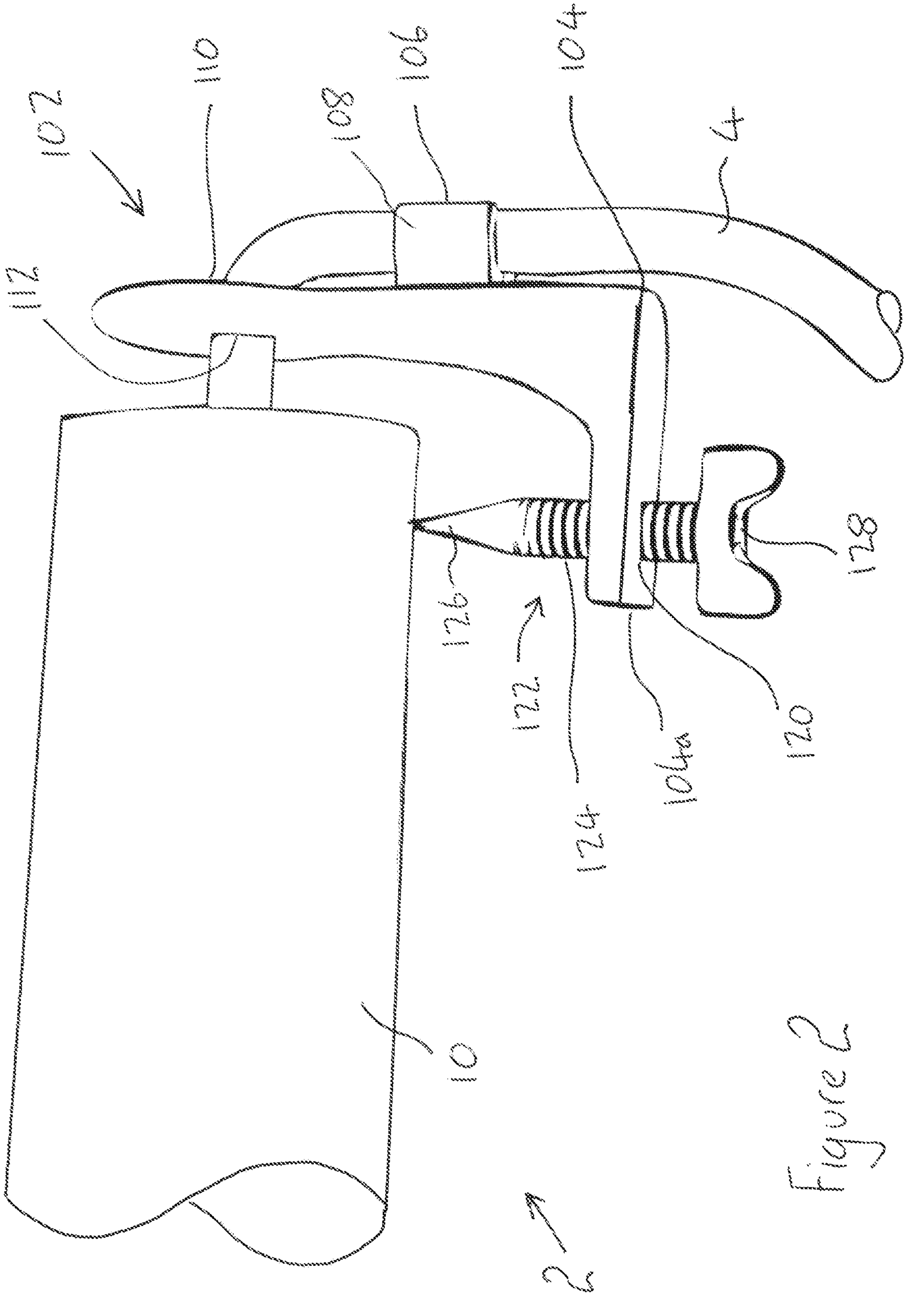
FIG. 2 is a first view of one embodiment of a lock assembly of the present invention located on a roller assembly.
Figure 3:
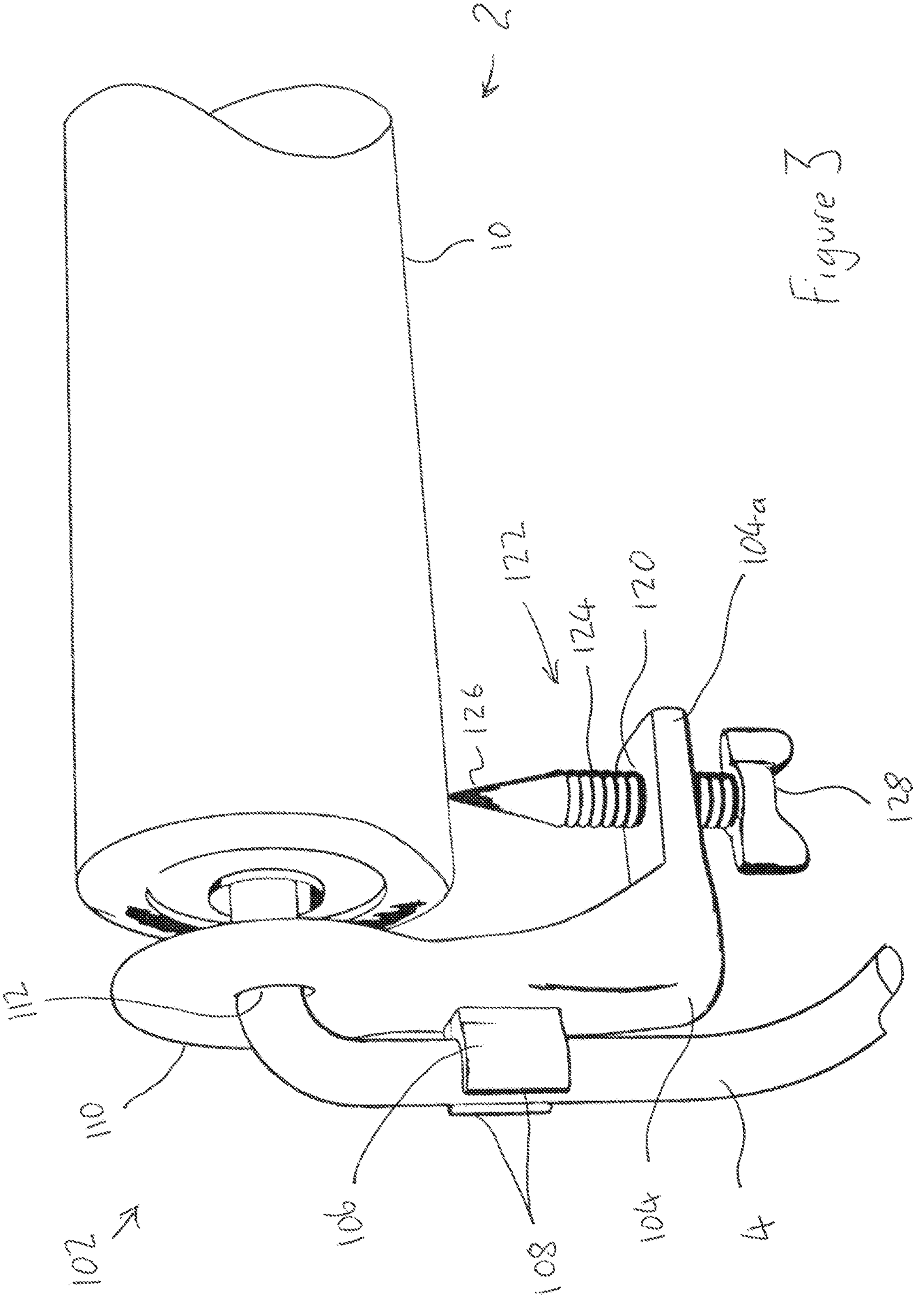
FIG. 3 is a second view of the lock assembly and roller assembly of FIG. 2.

A first embodiment of the lock assembly of the present invention is shown in FIGS. 2 and 3. The lock assembly, generally indicated as 102, is shown in position on the frame 4 of the roller assembly 2.

The lock assembly 102 comprises a lock member support 104. The lock member support 104 of this embodiment is formed from plastic by moulding. The lock member support 104 has a portion 104*a* extending parallel to the longitudinal axis of the roller 10. The lock member support 104 comprises a clip 106 having two opposing, spaced apart resilient clip members 108. As shown in FIG. 3, each clip member 108 extends partially around a portion of the frame 4 such that the clip 106 accommodates and grips a portion of the frame. The clip 106 is formed integrally with the lock member support 104. The lock member support 104 further comprises a support 110 having a bore 112 to form a ring extending around a portion of the frame 4 adjacent the roller 10, as shown in FIG. 2.

Due to the form of the support 110, to install the lock assembly 102, the roller 10 is first removed from the frame 4, allowing the support 110 to be passed over the frame 4 until the clip 106 engages with the frame 4, as shown in FIG. 2. The roller 10 may then be replaced on the frame 4.

The lock member support 104 has the portion 104*a* extending parallel with the longitudinal axis of the roller 10, as noted above. The portion 104*a* is provided with a threaded bore 120. A lock member 122 having a threaded shank 124 is threadably engaged with the bore 120. The end of the lock member 122 closest to the roller 10 is provided with a point 126. The opposite end of the lock member 122 is provided with a grip portion 128 comprising two wings. In use, the grip portion 128 may be gripped by a user to turn the lock member 122. Rotation of the lock member 122 moves the lock member between the first position, in which the point 126 is not in contact with the outer surface of the roller, and the second position in which the point 126 contacts the outer surface of the roller, as shown in FIGS. 2 and 3, and prevents the roller 10 rotating about the frame 4.

Figure 4:
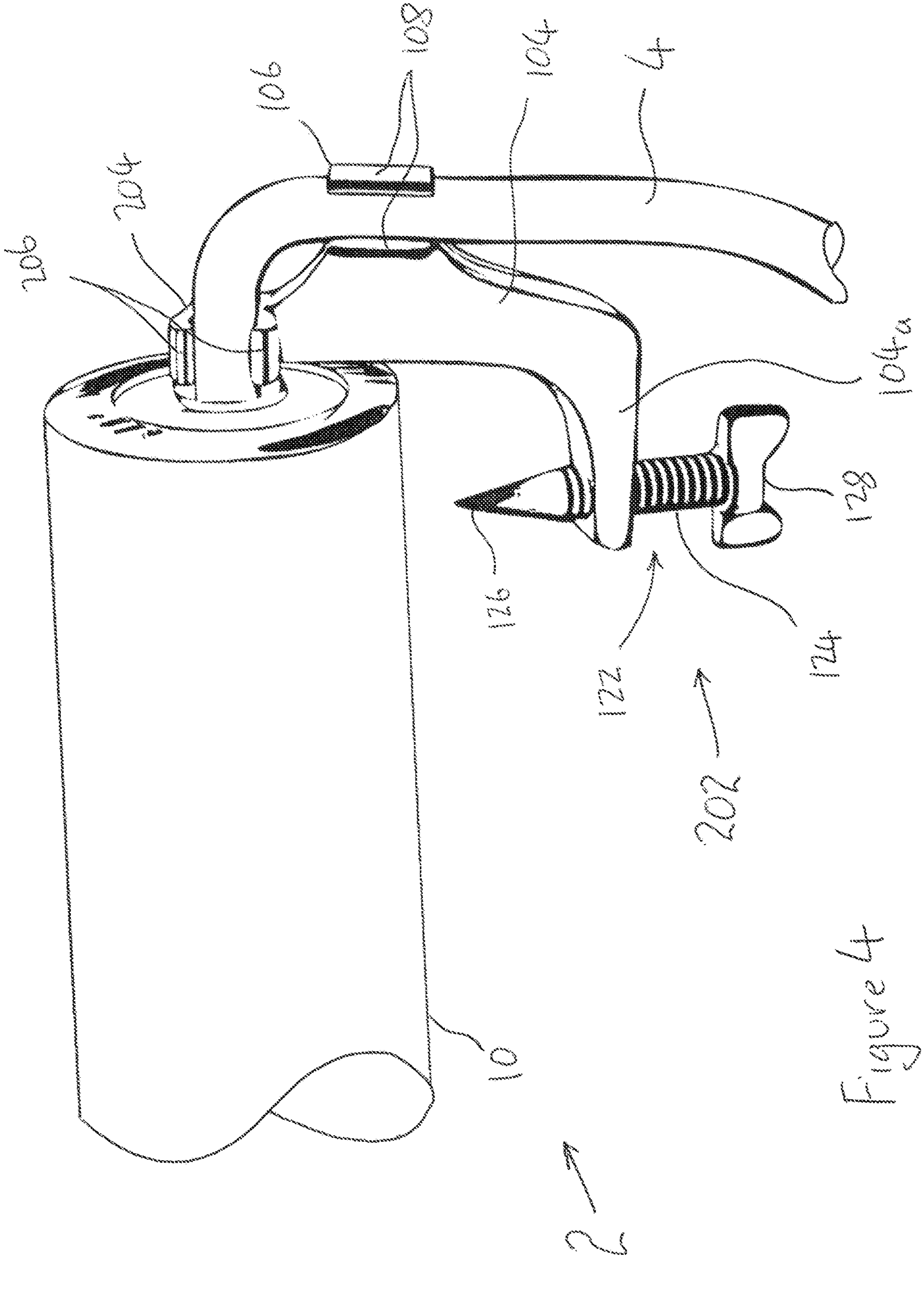
FIG. 4 is a first view of a further embodiment of a lock assembly of the present invention located on a roller assembly.
Figure 5:
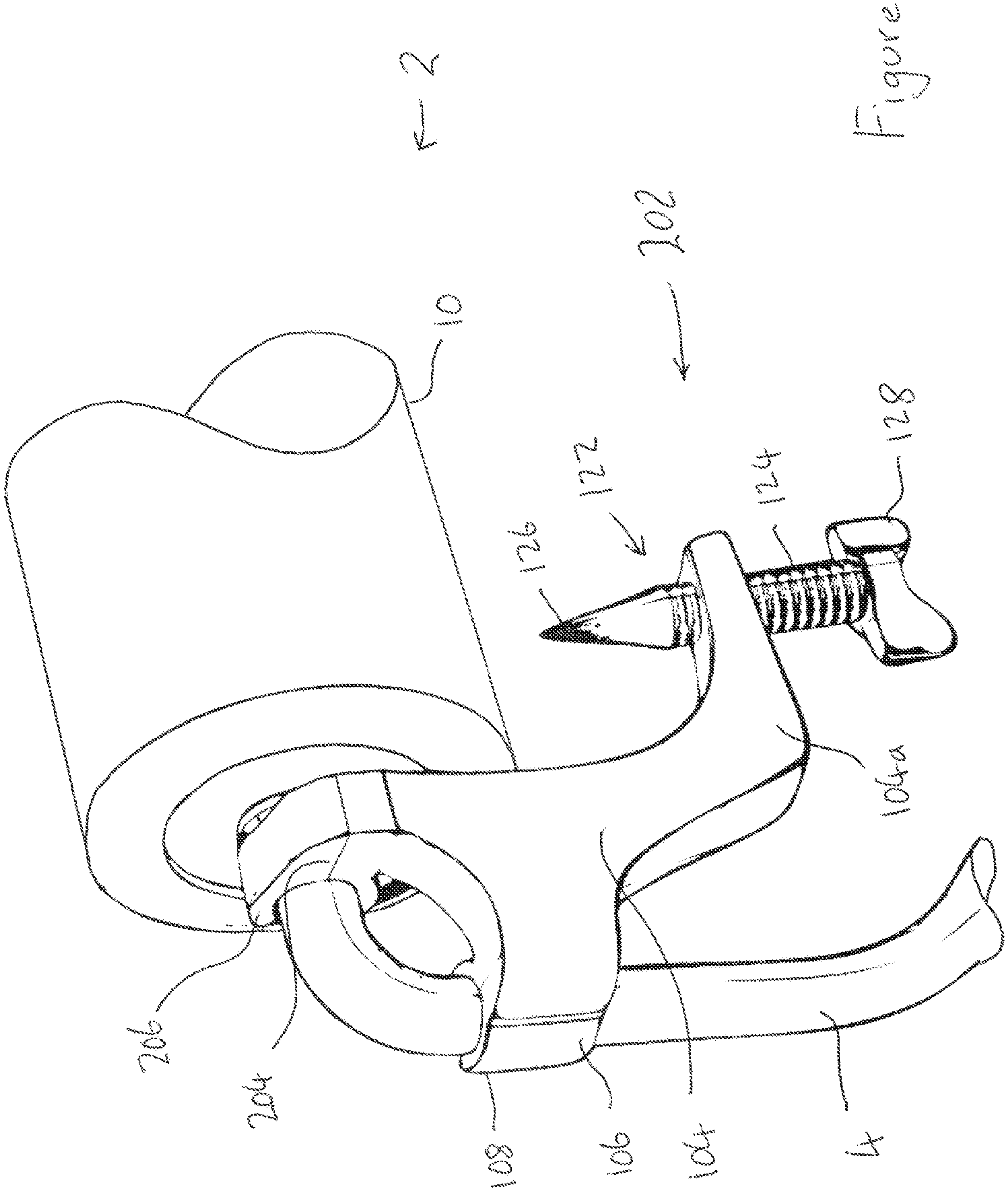
FIG. 5 is a second view of the lock assembly and roller assembly of FIG. 4.

Turning to FIGS. 4 and 5, there is shown a further embodiment of the lock assembly of the present invention mounted on a roller assembly 2. The lock assembly, generally indicated as 202, has the same general configuration as the lock assembly of FIGS. 2 and 3. Components of the lock assembly of FIGS. 4 and 5 common to the embodiment of FIGS. 2 and 3 are indicated using the same reference numerals and are as described above.

In the lock assembly 202 of FIGS. 4 and 5, the support 110 is replaced by a clip 204 having two opposing, spaced apart resilient clip members 206. As shown in FIGS. 4 and 5, the clip 204 is oriented perpendicular to the clip 106 and engages a portion of the frame 4 adjacent the roller 10.

The clips 106, 204 allow the lock assembly 202 of FIGS. 4 and 5 to be mounted to the frame 4 and removed from the frame without dismantling the roller assembly 2.

Figure 6:
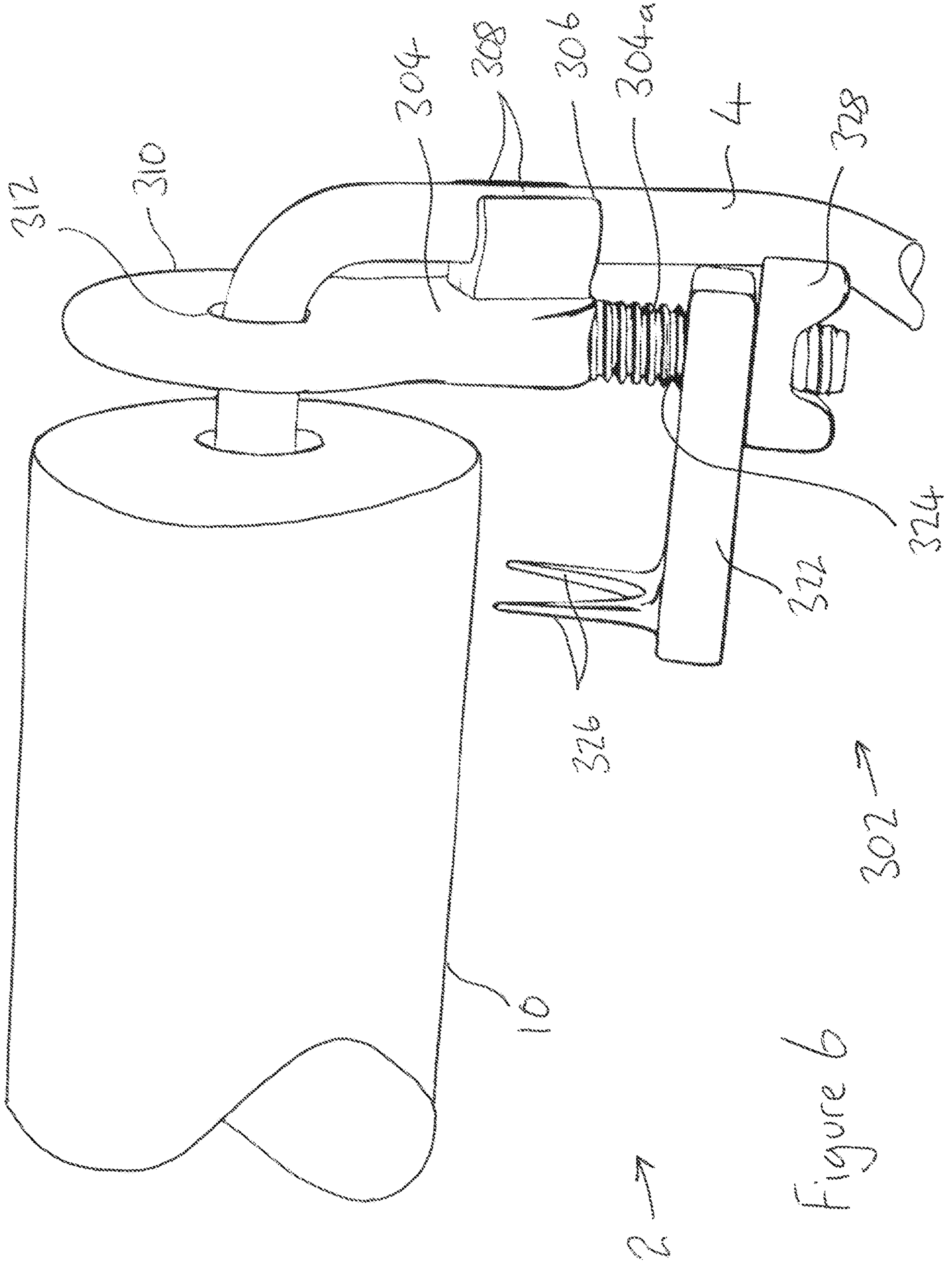
FIG. 6 is a first view of a further embodiment of a lock assembly of the present invention located on a roller assembly.
Figure 7:
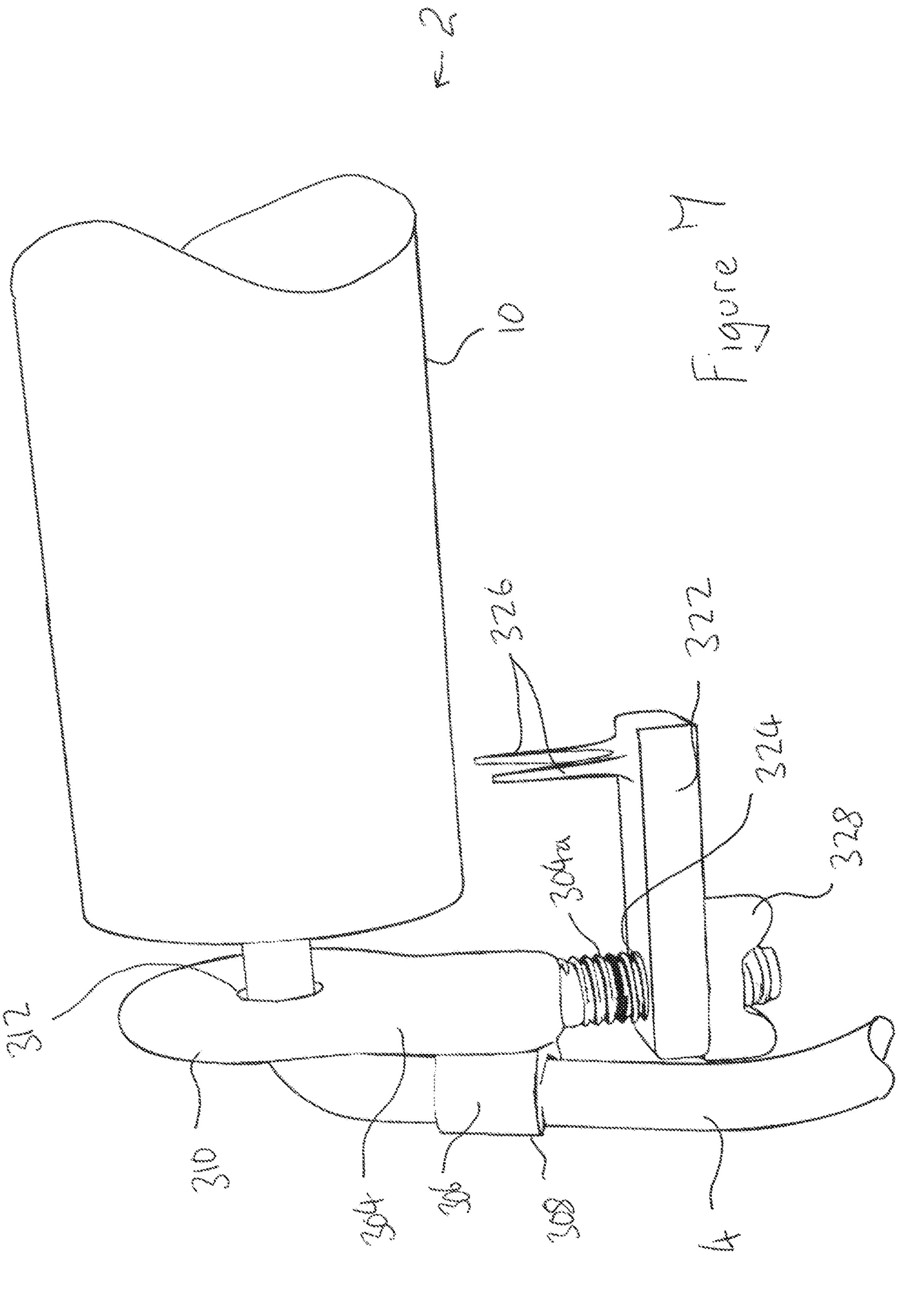
FIG. 7 is a second view of the lock assembly and roller assembly of FIG. 6.

Referring now to FIGS. 6 and 7, there is shown a still further embodiment of the lock assembly of the present invention. The lock assembly, generally indicated as 302, is mounted on the frame 4 of a roller assembly 2.

The lock assembly 302 comprises a lock member support 304. The lock member support 304 of this embodiment is formed from plastic by moulding. The lock member support 304 has a portion 304*a* extending perpendicular to the longitudinal axis of the roller 10. The lock member support 304 comprises a clip 306 having two opposing, spaced apart resilient clip members 308. As shown in FIG. 6, each clip member 308 extends partially around a portion of the frame 4 such that the clip 306 accommodates and grips a portion of the frame. The clip 306 is formed integrally with the lock member support 304. The lock member support 304 further comprises a support 310 having a bore 312 to form a ring extending around a portion of the frame 4 adjacent the roller 10, as shown in FIG. 6.

Due to the form of the support 310, to install the lock assembly 302, the roller 10 is first removed from the frame 4, allowing the support 310 to be passed over the frame 4 until the clip 306 engages with the frame 4, as shown in FIG. 7. The roller 10 may then be replaced on the frame 4.

The lock member support 304 has the portion 304*a* extending perpendicular with the longitudinal axis of the roller 10, as noted above. The portion 304*a* is cylindrical and is provided with a thread on its surface. A lock member 322 having a bore 324 is slideably mounted on the portion 304*a* and extends parallel with the longitudinal axis of the roller 10. A coil spring 304*b* is provided on the portion 304*a* of the lock member support 304. The spring 304*b* biases the lock member 322 into the first position, that is away from the roller 10. The end portion of the lock member 322 distal of the lock member support 304 is provided with a pair of tangs 326 extending towards the curved outer surface of the roller 10. A wing nut 328 is provided on the threaded portion 304*a* of the lock member support 304. Rotation of the wing nut 328 by the user moves the lock member 322 between the first position, in which the tangs 326 are spaced from the surface of the roller as shown in FIGS. 6 and 7, and the second position, in which the tangs 326 engage with the surface of the roller 10 and prevent the roller rotating about the frame 4.

Figure 8:
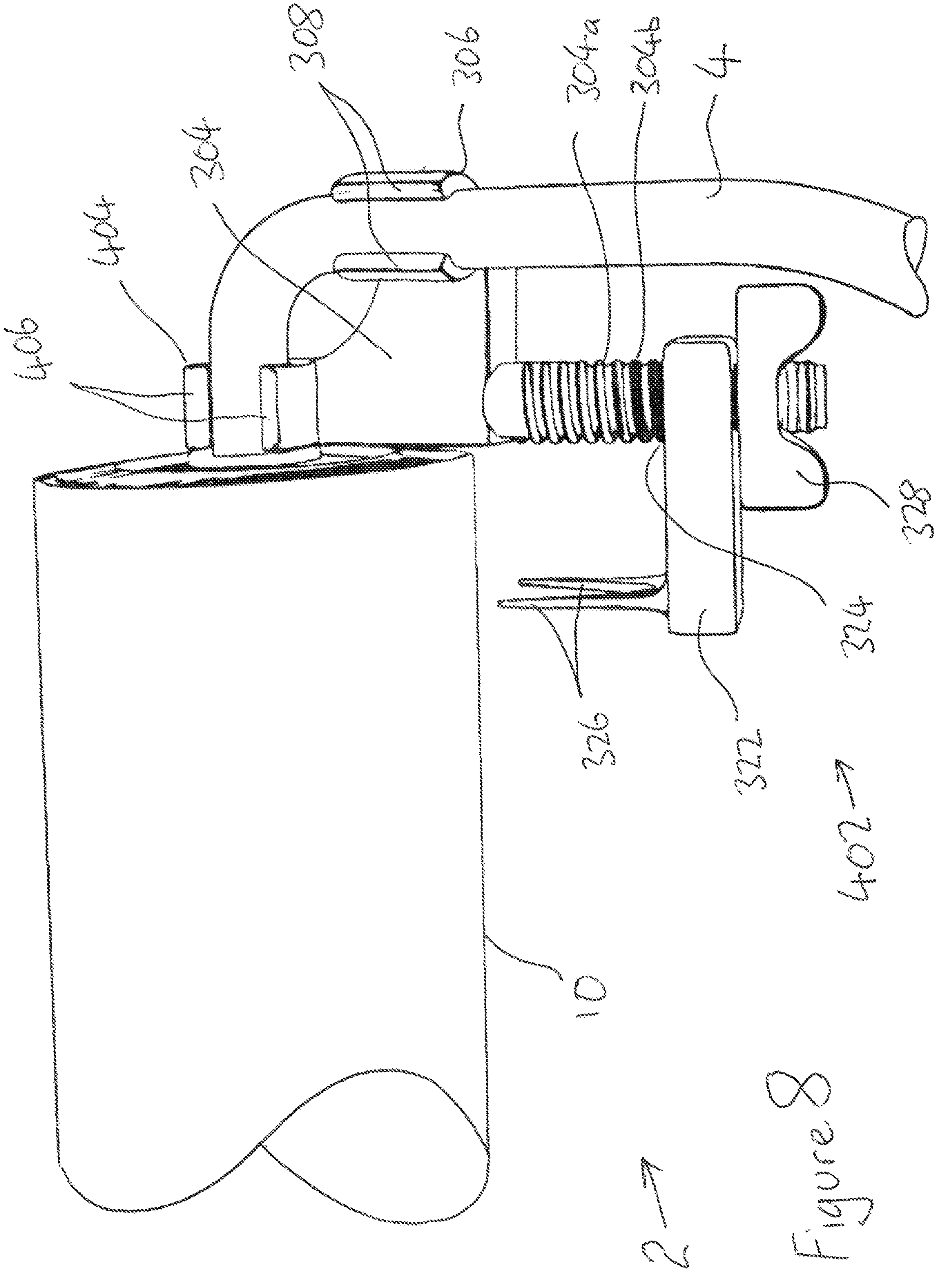
FIG. 8 is a first view of a further embodiment of a lock assembly of the present invention located on a roller assembly.
Figure 9:
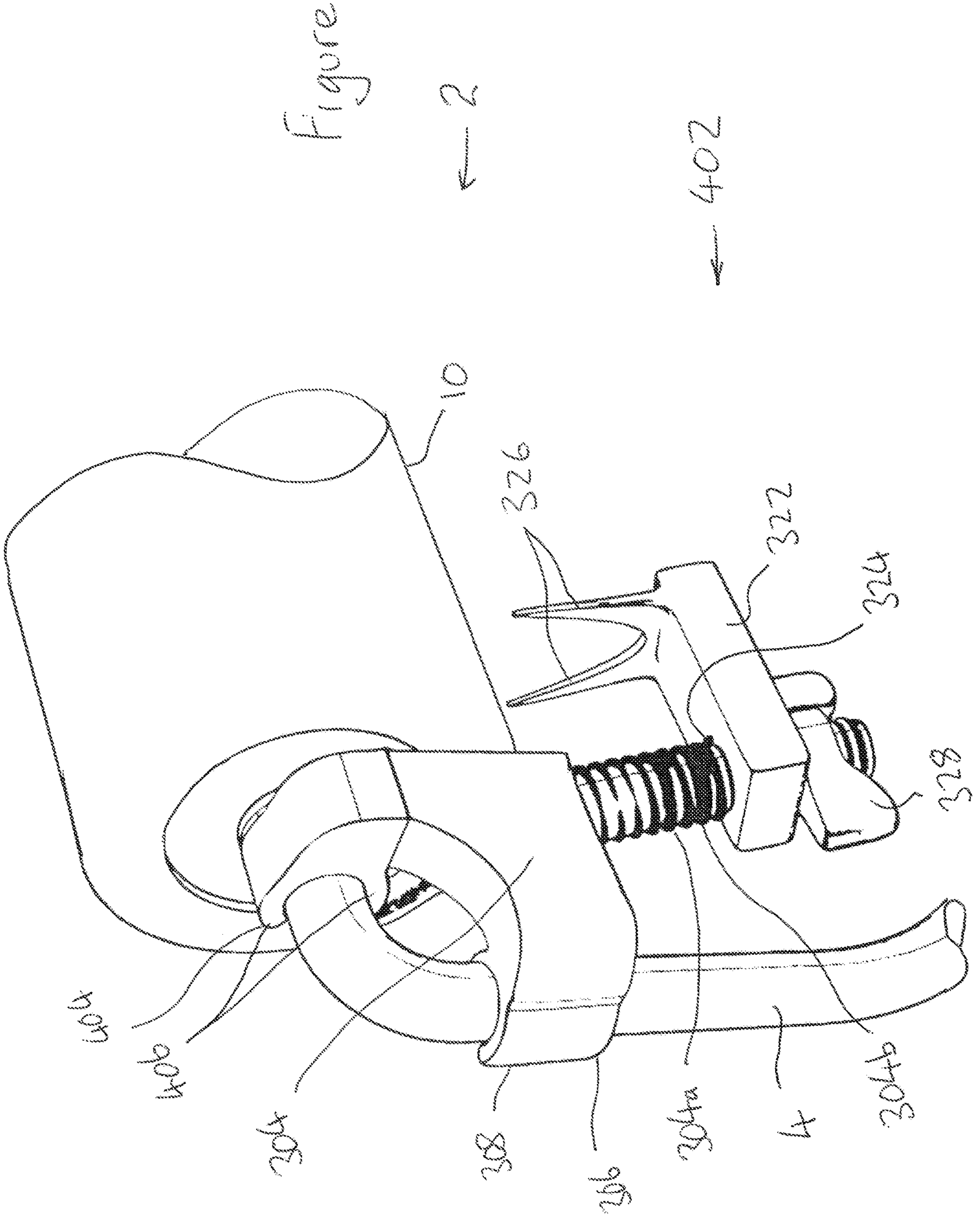
FIG. 9 is a second view of the lock assembly and roller assembly of FIG. 8.

Turning to FIGS. 8 and 9, there is shown a further embodiment of the lock assembly of the present invention mounted on a roller assembly 2. The lock assembly, generally indicated as 402, has the same general configuration as the lock assembly of FIGS. 6 and 7. Components of the lock assembly of FIGS. 8 and 9 common to the embodiment of FIGS. 6 and 7 are indicated using the same reference numerals and are as described above.

In the lock assembly 402 of FIGS. 8 and 9, the support 310 is replaced by a clip 404 having two opposing, spaced apart resilient clip members 406. As shown in FIGS. 8 and 9, the clip 404 is oriented perpendicular to the clip 306 and engages a portion of the frame 4 adjacent the roller 10.

The clips 306, 404 allow the lock assembly 402 of FIGS. 8 and 9 to be mounted to the frame 4 and removed from the frame without dismantling the roller assembly 2.

Figure 10:
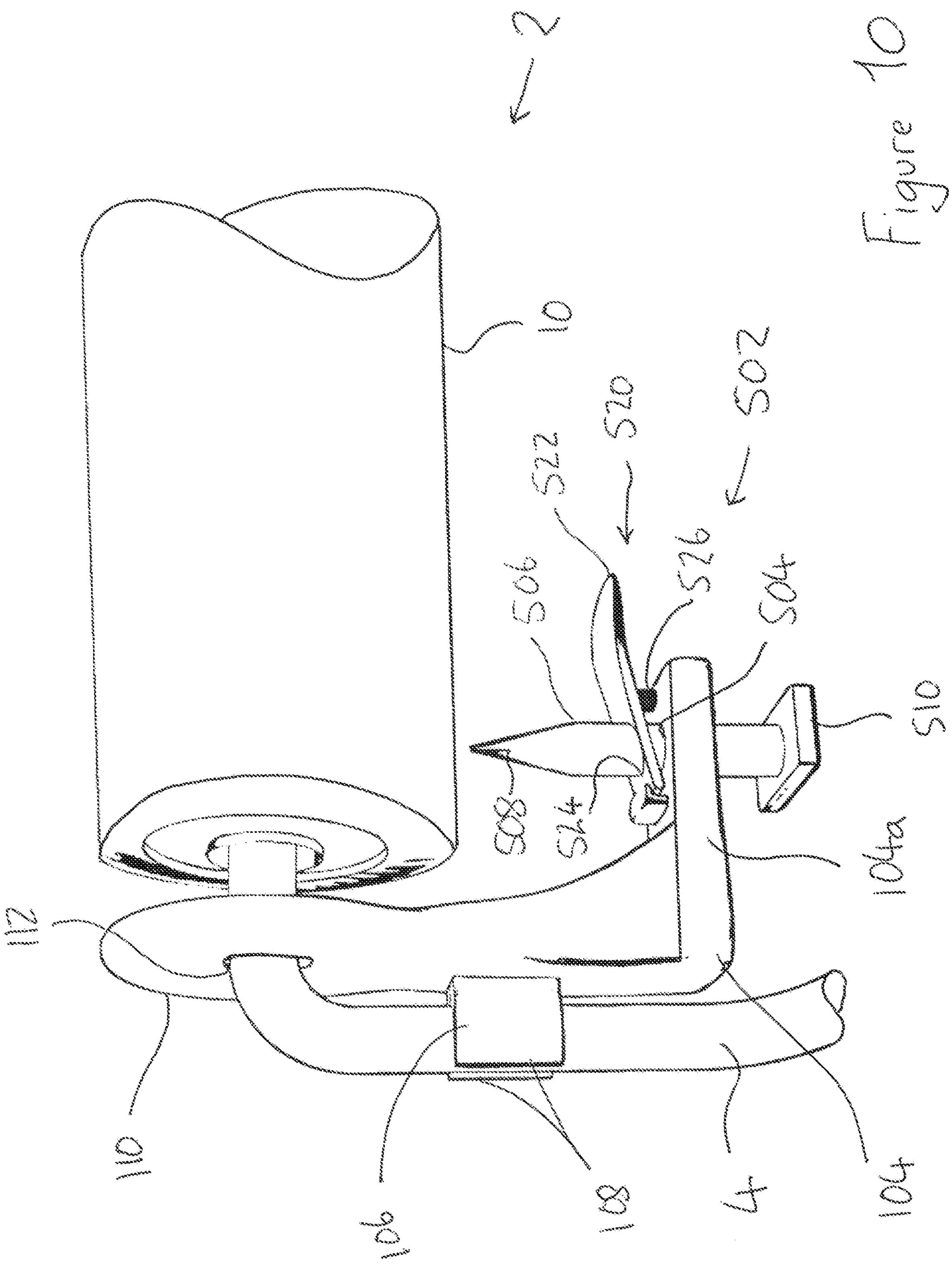
FIG. 10 is a first view of a further embodiment of a lock assembly of the present invention located on a roller assembly.
Figure 11:
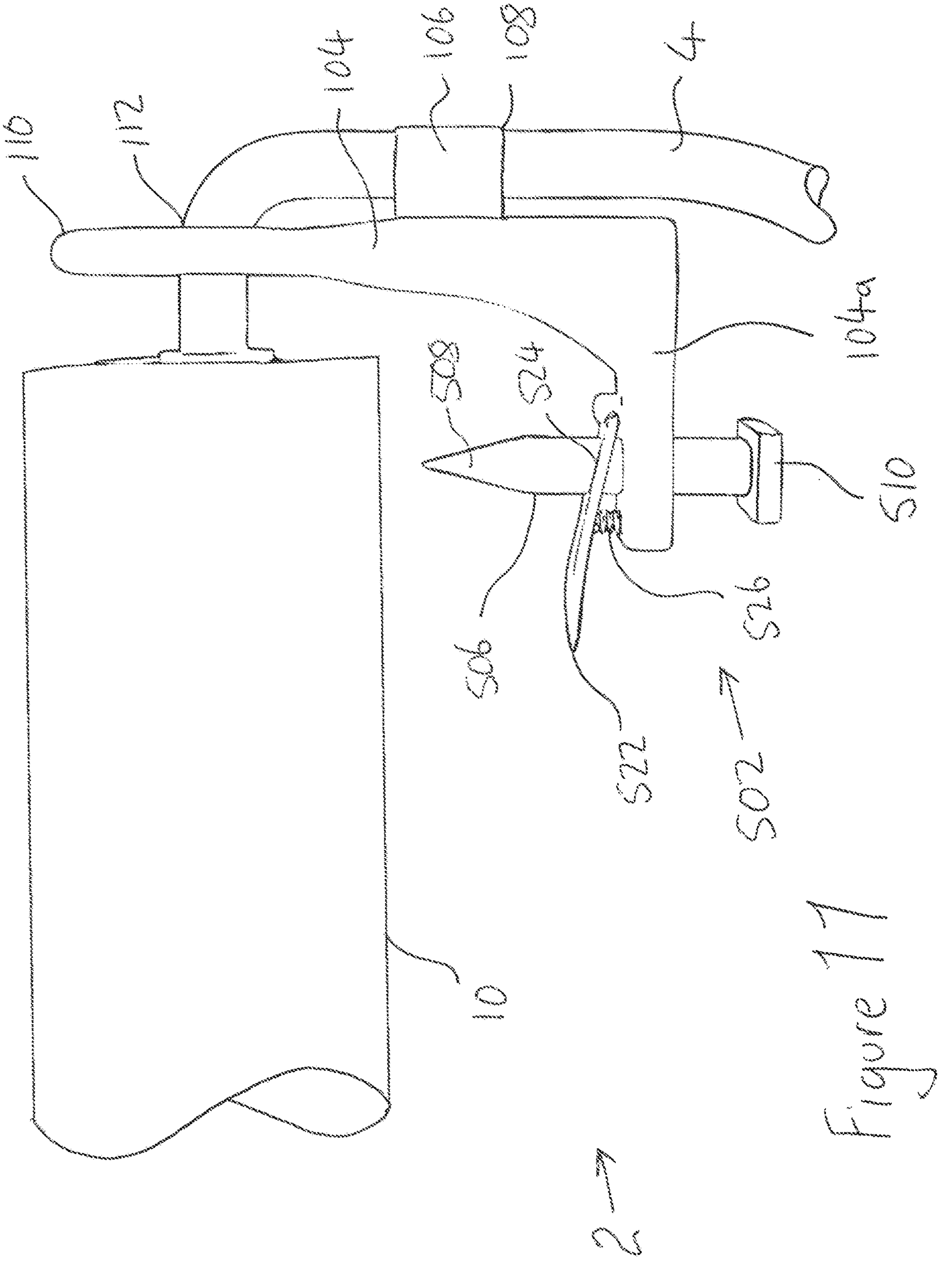
FIG. 11 is a second view of the lock assembly and roller assembly of FIG. 10.

Turning now to FIGS. 10 and 11, there is shown a further embodiment of the lock assembly of the present invention mounted on a roller assembly 2. The lock assembly, generally indicated as 502, has the same general configuration as the lock assembly of FIGS. 2 and 3. Components of the lock assembly of FIGS. 10 and 11 common to the embodiment of FIGS. 2 and 3 are indicated using the same reference numerals and are as described above.

In the lock assembly 502 of FIGS. 10 and 11, there is a plain bore 504 in the portion 104*a* of the lock member support 104. A lock member 506 is provided in the form of a pin extending through the bore 504. The lock member 506 has a sharpened point 508 at its end adjacent the roller 10. The opposite end of the lock member 506 is provided with a cap 510.

Movement of the lock member 506 through the bore 504 is controlled by a clamp, generally indicated as 520. The clamp 520 comprises a clamp member 522 pivotably mounted to the portion 504*a* of the lock member support 104. The clamp member 522 has a hole 524 therein, with the lock member 506 extending therethrough. In a first position, as shown in FIGS. 10 and 11, the clamp member 522 is angled so as to cause the edges of the hole 524 to grip the lock member 506. Moving the clamp member 522 to a second position, in which the clamp member is substantially perpendicular to the lock member 522, causes the lock member 522 to be released and free to move within the bore 504. In this state, the lock member 522 may be moved so as the sharpened point 508 engages with the surface of the roller 10. The clamp member 522 is biased into the first position by a small spring 526. Thus, when the clamp member 522 is released, the lock member 522 is held in its position.

Figure 12:
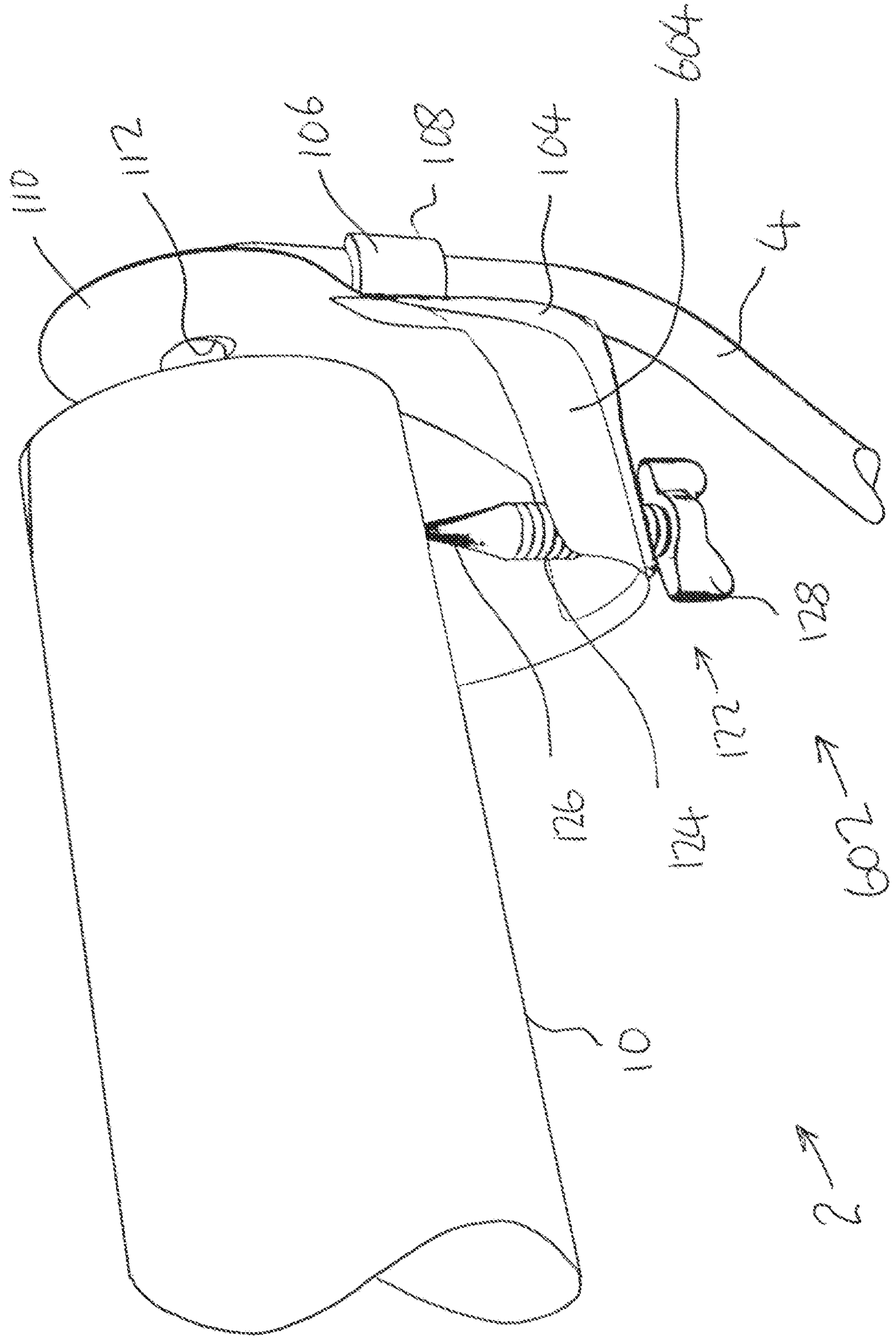
FIG. 12 is a view of a further embodiment of a lock assembly of the present invention located on a roller assembly.

FIG. 12 shows a further embodiment of the lock assembly of the present invention. The lock assembly shown in FIG. 12 has the same general configuration as the embodiment of FIGS. 2 and 3. Components of the lock assembly of FIG. 12 common to the embodiment of FIGS. 2 and 3 are indicated using the same reference numerals and are as described above.

The lock assembly of FIG. 12, generally indicated as 602, further comprises a guard 604. The guard 604 is formed integrally with the lock member support 104 and extends between the lock member support 104 and the roller 10. A hole is provided in the guard 604, through which the lock member 122 extends. The guard protects parts of the lock assembly 602 from liquid which may splash from the roller 10 during use.

Figure 13:
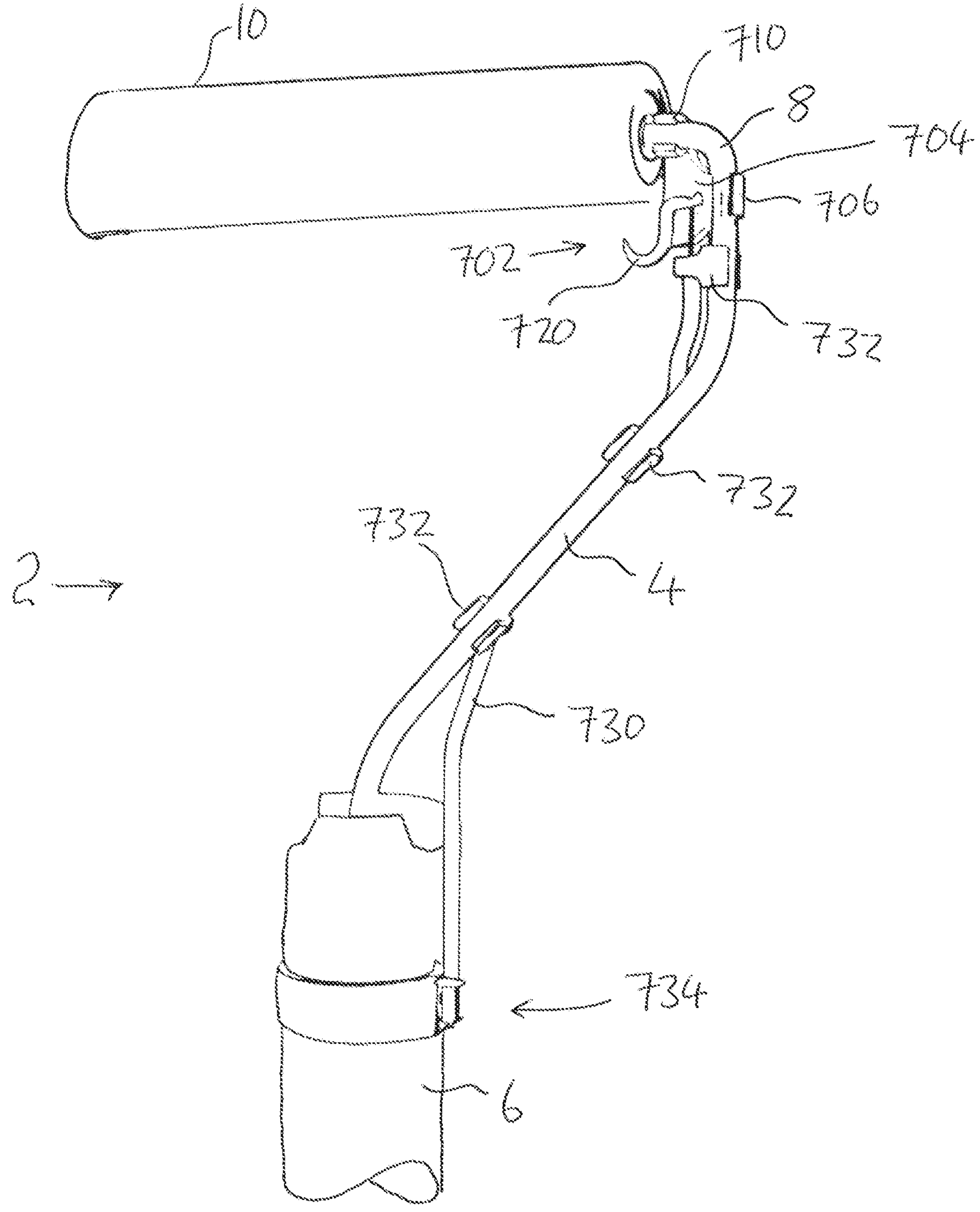
FIG. 13 is a view of a further embodiment of a lock assembly of the present invention located on a roller assembly.
Figure 14:
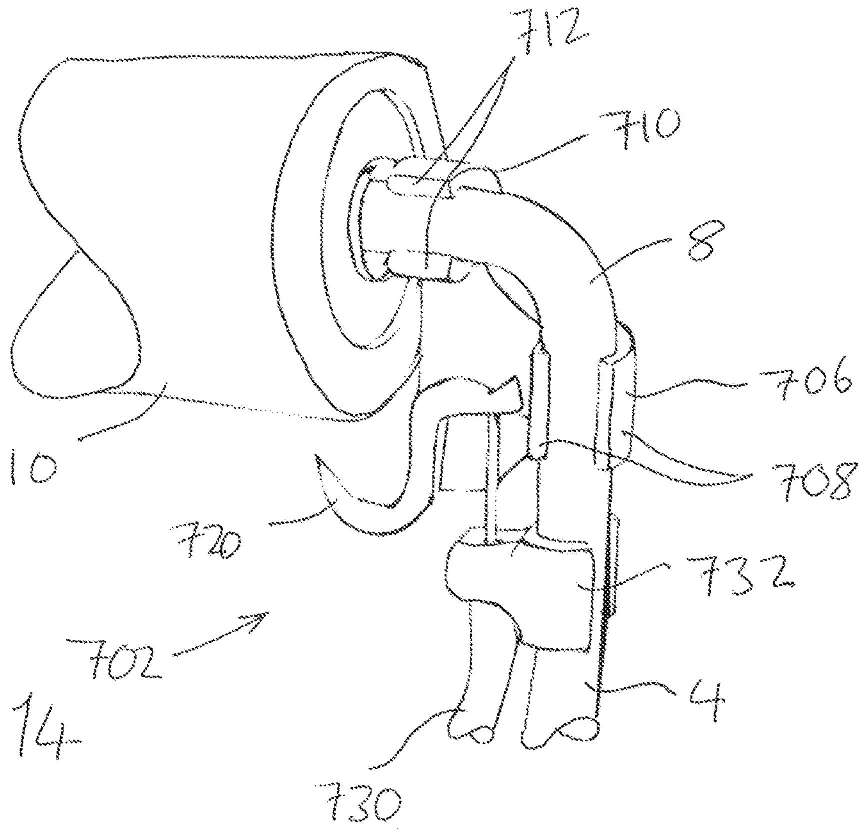
FIG. 14 is an enlarged view of the lock assembly portion of the embodiment of FIG. 13.
Figure 15:
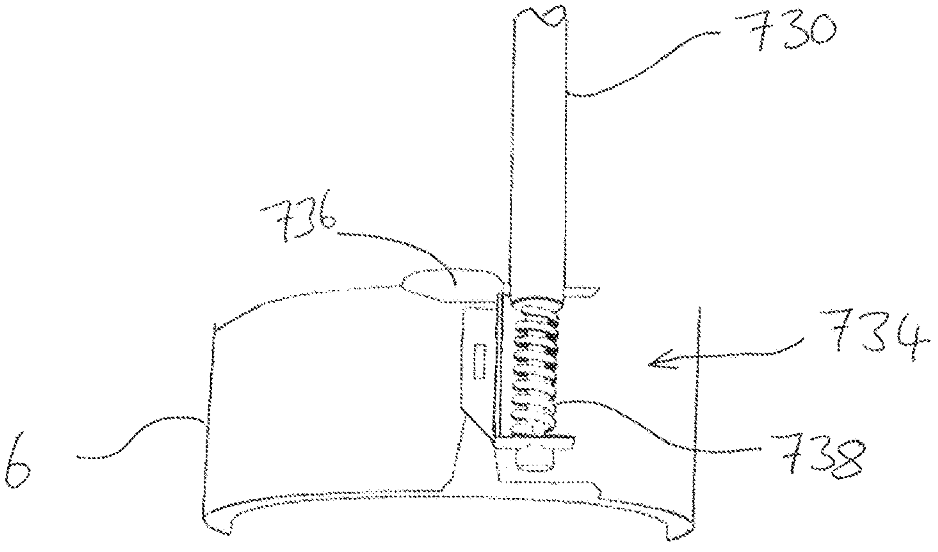
FIG. 15 is an enlarged view of the trigger assembly of the embodiment of FIG. 13.

Finally, reference is made to FIGS. 13 to 15. FIG. 13 shows a further embodiment of the lock assembly of the present invention mounted on a roller assembly. The lock assembly, generally indicated as 702, comprises a lock member support 704. The lock member support 704 of this embodiment is formed from plastic by moulding. The lock member support 704 comprises a first clip 706 having two opposing, spaced apart resilient clip members 708. As shown in FIG. 14, each clip member 708 extends partially around a portion of the frame 4 such that the clip 706 accommodates and grips a portion of the frame. The clip 706 is formed integrally with the lock member support 704. The lock assembly 702 further comprises a second clip 710 having two opposing, spaced apart resilient clip members 712. As shown in FIGS. 13 and 14, the clip 710 is oriented perpendicular to the clip 706 and engages a portion of the frame 4 adjacent the roller 10. Again, the clip 710 is formed integrally with the lock member support 704.

The clips 706, 710 allow the lock assembly 702 of FIGS. 13 and 14 to be mounted to the frame 4 and removed from the frame without dismantling the roller assembly 2.

A lock member 720 is in the form of a hook pivotably mounted to the lock member support 704. The lock member 720 is moveable between a first position, shown in FIGS. 13 and 14 in which the sharpened tip of the hook is spaced from the roller 10, and a second position, in which the sharpened tip of the hook engages the curved surface of the roller 10.

In the embodiment shown in FIGS. 13 to 15, the lock member 720 is operated by a Bowden cable 730 extending from the lock assembly 702 to the handle portion 6 of the roller assembly 2. The outer sheath of the Bowden cable 730 is secured to the frame 4 by clips 732. The distal end of the inner cable of the Bowden cable 730 is attached to the lock member 720, as shown in FIG. 14. The proximal end of the inner cable of the Bowden cable 730 is attached to a trigger assembly 734. The trigger assembly 734 comprises a trigger 736 and a spring 738 biasing the inner cable to urge the lock member 720 into the first position shown in the Figures. When the user presses the trigger 736, the spring 738 is extended and the inner cable is moved so as to pivot the lock member into the second position, in which the sharpened tip of the hook engages with the curved surface of the roller 10. When the user releases the trigger 736, the spring returns the inner cable to the position shown in the Figures and urges the lock member 720 to disengage from the roller and move into the first position shown.

Figure 16:
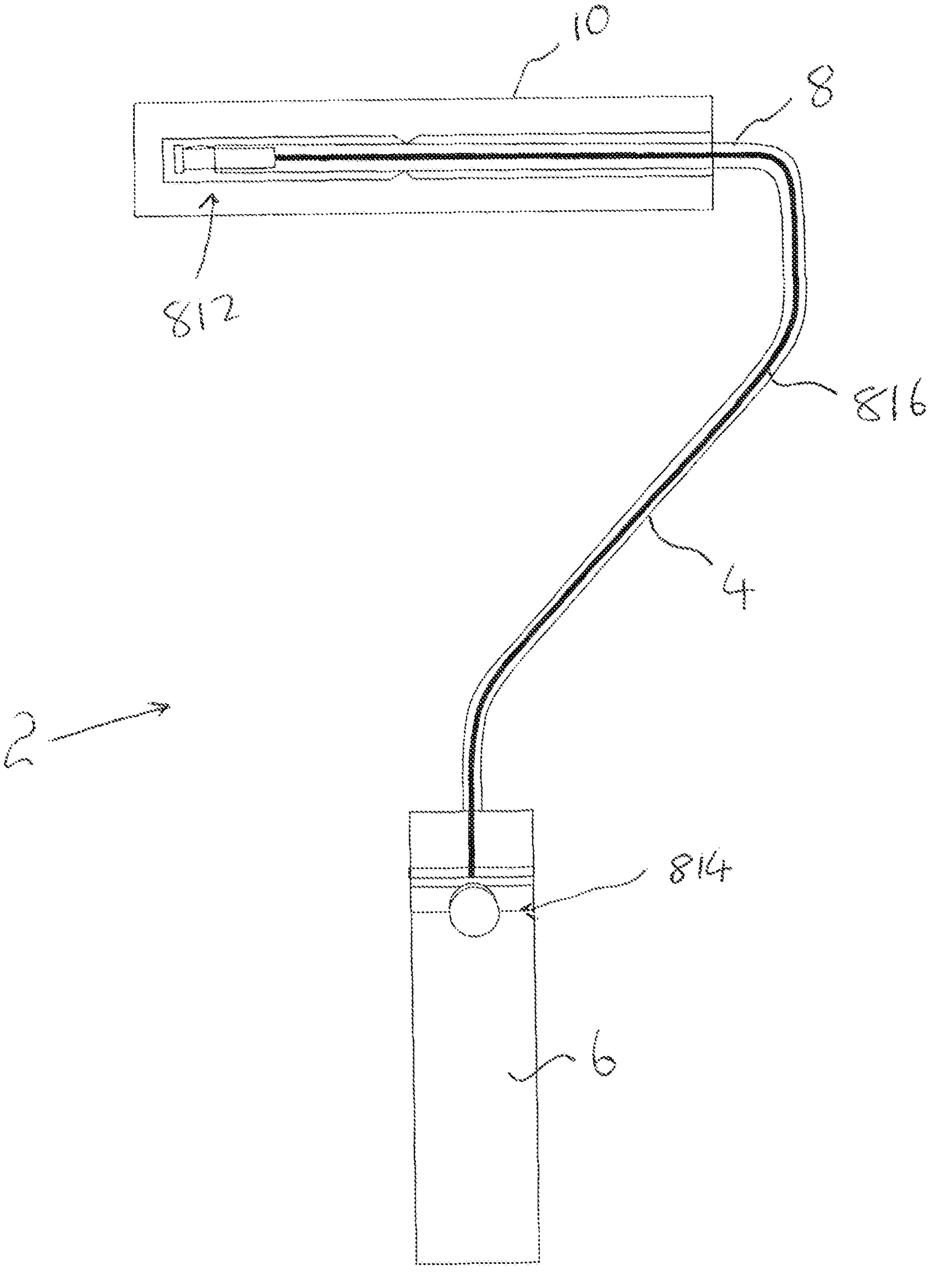
FIG. 16 is a diagrammatic representation of a roller assembly of a further embodiment of the present invention.

Turning now to FIG. 16, there is shown a further embodiment of a roller assembly according to the present invention. The roller assembly 2 has the same general configuration as the assembly shown in FIG. 1 and comprises a frame 4 having a handle portion 6 and support portion 8. A generally cylindrical roller 10 is mounted on the support portion 8 and is rotatable with respect to the frame 4.

In the embodiment shown in FIG. 16, a lock assembly, generally indicated as 812. is disposed within the roller. The lock assembly 812 is operated remotely from the handle 6 by the user by way of a trigger assembly, generally indicated as 814, acting on a cable 816 extending through the frame 4.

Figure 17:
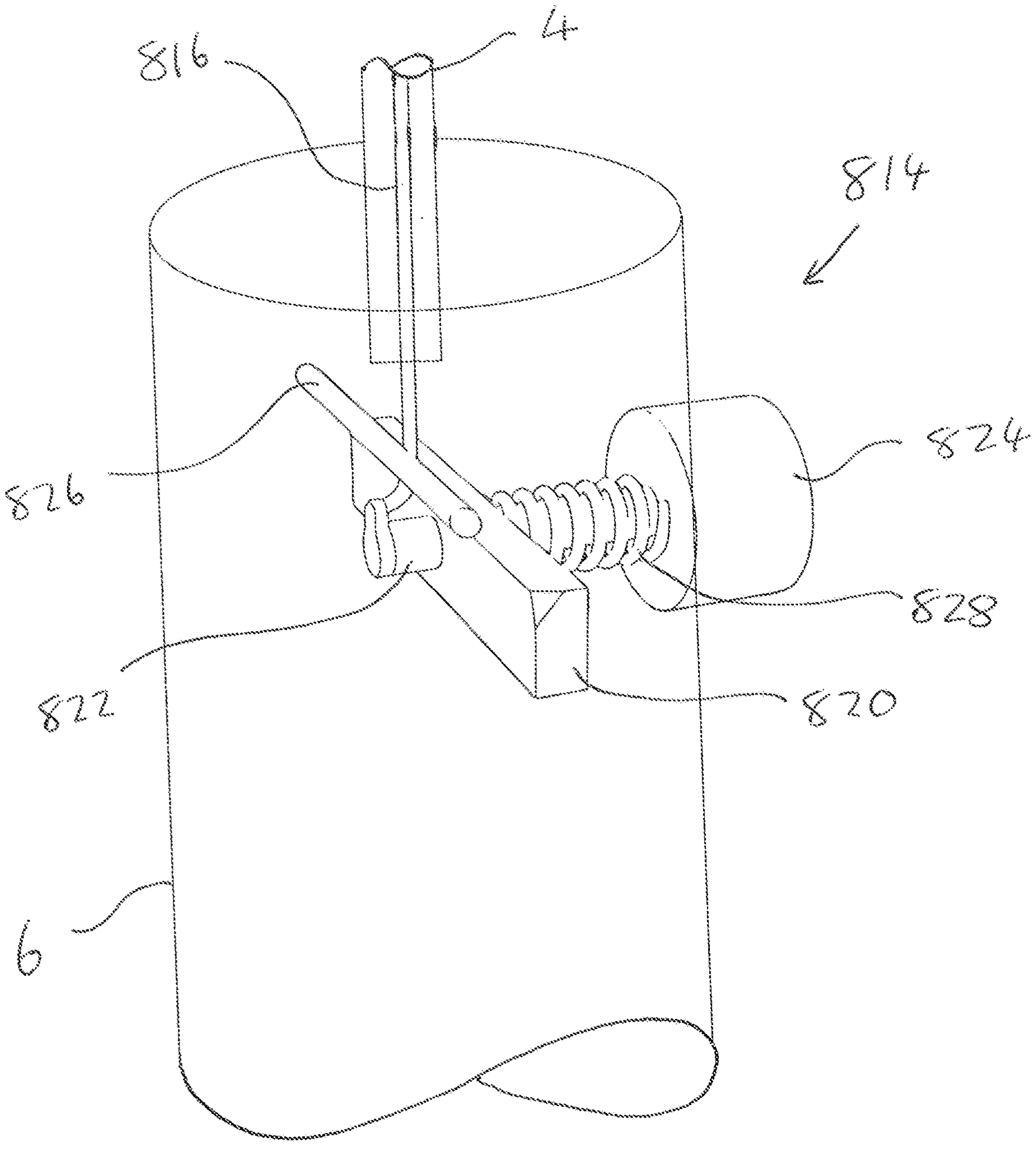
FIG. 17 is a diagrammatic view of the handle portion of the roller assembly of FIG. 16.

The trigger assembly 814 is shown in more detail in FIG. 17 and comprises a trigger support 820 extending laterally across the interior of the handle 6. A moveable trigger 822 extends from a button 824 through the trigger support 820 and is connected at its distal end to the cable 816. As shown in FIG. 17, the cable 816 passes over a lateral cable support 826. A coiled spring 828 extends around the trigger 822 between the button 824 and the trigger support 820. The spring 828 biases the button 824 away from the trigger support 820.

In use, when the button 824 is pushed by the user, the trigger 822 moves through the trigger support 820 and pulls the cable 816, in turn activating the lock assembly 812 within the roller 10 to lock the roller relative to the frame 8.

The lock assembly 812 is shown in more detail in FIGS. 18*a* and 18*b*. The lock assembly 812 comprises a lock member 830 in the form of a strip of spring steel. A generally cylindrical lock actuating member 832 is connected to the end of the cable 816 and extends from within the end portion of the frame 8. The lock member 830 is held between a flange 834 on the distal end of the actuating member 832 and the end of the frame 8. In the position shown in FIG. 18*a*, the lock member 830 lies substantially straight and is not in contact with the roller 10. When the button 824 on the handle 6 is pushed, the cable 816 is pulled by the trigger assembly 814 and the lock actuating member 832 is pulled within the frame 8, the action of which is to apply a compressive force to the lock member 830. The action of the compressive force on the lock member 830 causes the lock member to bend and extend radially outwards. such that a portion of the lock member contacts an inner surface of the roller, as shown in FIG. 18*b*. In this position, the roller 10 is locked and does not rotate relative to the frame 8. When the button 824 is released, the resilient action of the lock member 830 and the spring 828 urges the lock actuating member 832 out of the end portion of the frame 8 and releases the roller 10 for rotation.

The lock member 830 may be used singly. Alternatively, a plurality of lock members may be used, such as two lock members or more, such as three or four lock members, preferably arranged equidistantly around the lock actuating member 832.

Figure 19A:
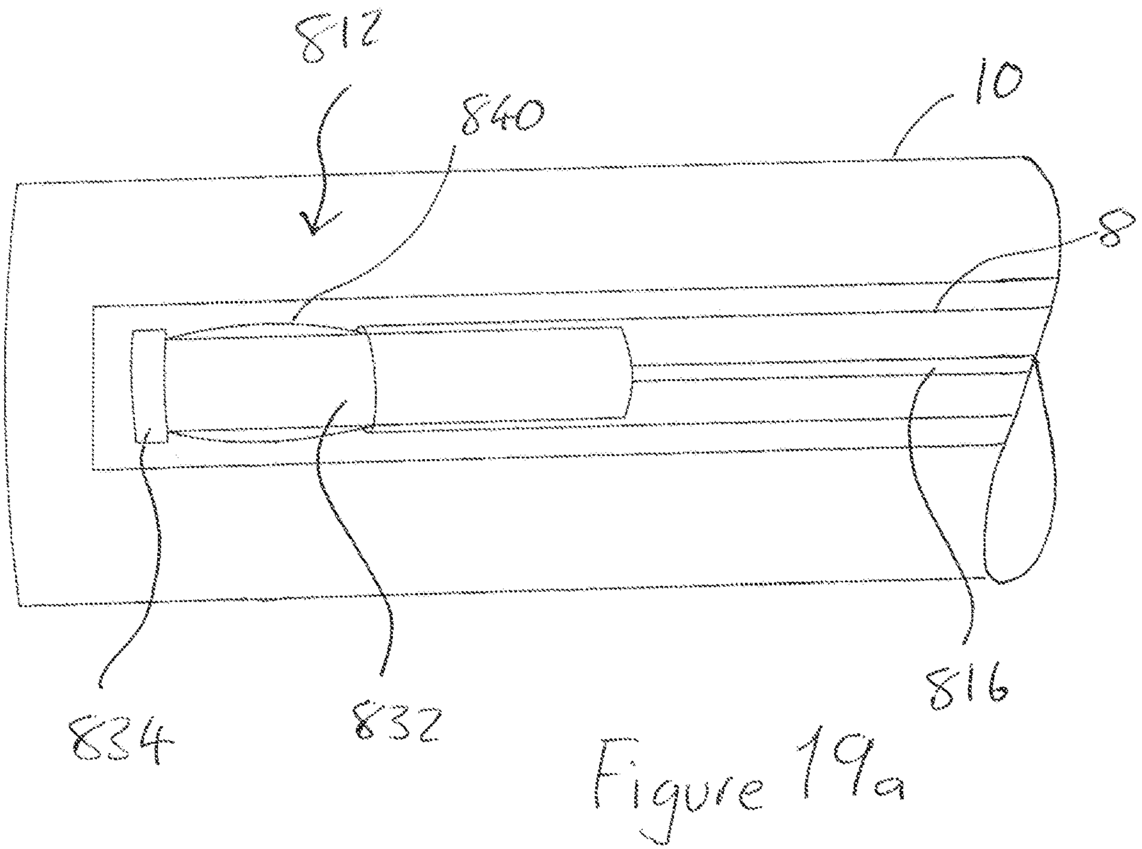
FIG. 19*a* is a diagrammatic view of the roller of the assembly of FIG. 16 with an alternative embodiment of the resilient locking member in a first position.
Figure 19B:
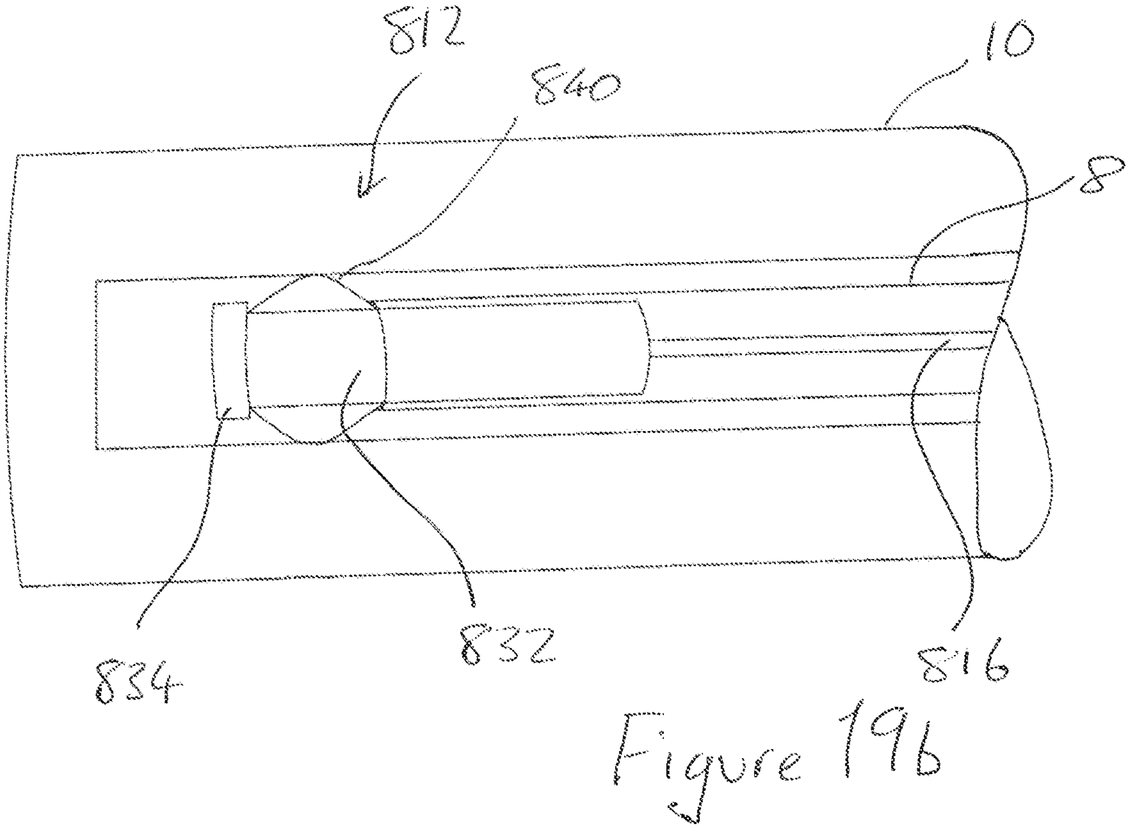
FIG. 19*b* is a diagrammatic view of the roller of the assembly of FIG. 16 with the alternative embodiment of the resilient locking member in a second position.

Turning to FIGS. 19*a* and 19*b*, an alternative arrangement for the lock assembly 812 is shown. In this embodiment, the lock assembly 812 employs a lock member 840 in the form of a resilient sleeve. The operation is analogous to that of the arrangement shown in FIGS. 18*a* and 18*b* and described above, with the resilient sleeve 840 moving from the unlocked position shown in FIG. 19*a* to the locked position shown in FIG. 19*b*.

The invention claimed is:

1. A lock assembly for mounting on a roller assembly having a handle, a frame comprising a support portion and a roller rotatably mounted on the support portion of the frame, the lock assembly being releasably mountable on the frame of the roller assembly spaced apart from the handle, the lock assembly comprising:

a lock member support for mounting in a fixed position on the frame of the roller assembly, wherein the lock support member comprises a first support member and a second support member, each of the first and second support members extending around at least a portion of the frame of the roller assembly when the lock assembly is attached to the roller assembly, and wherein the first support member is disposed to attach to a first portion of the frame and the second support member is disposed to attach to a second portion of the frame, the first and second portions of the frame not lying on a straight line;

a lock member mounted on the lock member support and moveable relative to the lock member support between a first position and a second position;

wherein when the lock assembly is employed with the roller, with the lock member in the first position the roller is rotatable relative to the frame and with the lock member in the second position, the lock member engages with the roller to prevent rotation of the roller relative to the frame of the roller assembly.

2. The lock assembly according to claim 1, wherein the lock member engages with the exterior of the roller or engages with the interior of the roller.

3. The lock assembly according to claim 1, wherein the lock member engages with a curved surface of the roller.

4. The lock assembly according to claim 1, wherein the lock member is moveable between the first and second positions by rotation of the lock member and/or linear movement of the lock member; and/or wherein the lock member is deformable, whereby upon being deformed, a portion of the lock member moves from the first position to the second position.

5. The lock assembly according to claim 1, wherein the lock member is biased into one of the first position or the second position.

6. The lock assembly according to claim 1, wherein the lock member is held in one or both of the first position and the second position.

7. The lock assembly according to claim 6, wherein the lock assembly comprises a releasable lock to hold the lock member in one or both of the first and second positions.

8. The lock assembly according to claim 1, wherein the lock assembly comprises an actuator, whereby the user can move the lock member between the first position and the second position indirectly.

9. The lock assembly according to claim 8, wherein the actuator comprises a cable.

10. The lock assembly according to claim 1, further comprising a guard, in use the guard extending between at least a portion of the lock assembly and the roller.

11. A roller assembly comprising:

a handle;

a frame comprising a support portion;

a roller rotatably mounted on the support portion of the frame; and a lock assembly mounted on the frame of the roller assembly spaced apart from the handle, the lock assembly comprising:

a lock member support mounted in a fixed position on the frame of the roller assembly, wherein the lock support member comprises a first support member and a second support member, each of the first and second support members extending around at least a portion of the frame of the roller assembly when the lock assembly is attached to the roller assembly, and wherein the first support member is disposed to attach to a first portion of the frame and the second support member is disposed to attach to a second portion of the frame, the first and second portions of the frame not lying on a straight line;

a lock member mounted on the lock member support and moveable relative to the frame and the roller between a first position and a second position, wherein with the lock member in the first position the roller is rotatable relative to the frame and with the lock member in the second position, the lock member engages with the roller to prevent rotation of the roller relative to the frame.

12. A kit of parts comprising one or more roller assemblies, each roller assembly comprising:

a handle;

a frame comprising a support portion;

a roller rotatably mounted on the support portion of the frame; and one or more lock assemblies, each of said one or more lock assemblies releasably mountable on the frame of the roller assembly spaced apart from the handle; each of said one or more lock assemblies comprising:

a lock member support for mounting in a fixed position on the frame of the roller assembly, wherein the lock support member comprises a first support member and a second support member, each of the first and second support members extending around at least a portion of the frame of the roller assembly when the lock assembly is attached to the roller assembly, and wherein the first support member is disposed to attach to a first portion of the frame and the second support member is disposed to attach to a second portion of the frame, the first and second portions of the frame not lying on a straight line;

a lock member mounted on the lock member support and moveable relative to the lock member support between a first position and a second position;

wherein when the lock assembly is employed with the roller assembly, with the lock member in the first position the roller is rotatable relative to the frame and with the lock member in the second position, the lock member engages with the roller to prevent rotation of the roller relative to the frame.

* * * * *